(12) United States Patent
Subramanian et al.

(10) Patent No.: US 12,033,399 B1
(45) Date of Patent: Jul. 9, 2024

(54) TURN AND BRAKE ACTION PREDICTION USING VEHICLE LIGHT DETECTION

(71) Applicant: PlusAI, Inc., Santa Clara, CA (US)

(72) Inventors: Vignesh Subramanian, Santa Clara, CA (US); Anurag Paul, Campbell, CA (US); Abhishek Yadav, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/221,363

(22) Filed: Jul. 12, 2023

(51) Int. Cl.
| | |
|---|---|
| G06V 20/58 | (2022.01) |
| B60W 60/00 | (2020.01) |
| G06V 10/10 | (2022.01) |
| G06V 10/22 | (2022.01) |
| G06V 10/74 | (2022.01) |
| G06V 10/764 | (2022.01) |
| G06V 10/774 | (2022.01) |
| G06V 10/82 | (2022.01) |

(52) U.S. Cl.
CPC ....... *G06V 20/584* (2022.01); *B60W 60/0015* (2020.02); *B60W 60/0016* (2020.02); *B60W 60/00274* (2020.02); *G06V 10/16* (2022.01); *G06V 10/225* (2022.01); *G06V 10/761* (2022.01); *G06V 10/764* (2022.01); *G06V 10/774* (2022.01); *G06V 10/82* (2022.01); *B60W 2554/4045* (2020.02); *B60W 2554/408* (2020.02)

(58) Field of Classification Search
CPC ... B60W 60/001606; B60W 60/00274; B60W 2554/4045; B60W 60/0016; G06V 10/16; G06V 10/225; G06V 10/761; G06V 10/764; G06V 10/774; G06V 10/82; G06V 20/584

USPC .......................................................... 701/28
See application file for complete search history.

(56) References Cited

U.S. PATENT DOCUMENTS

| | | | | |
|---|---|---|---|---|
| 2009/0092284 | A1* | 4/2009 | Breed | B60R 21/0153 382/103 |
| 2015/0117715 | A1* | 4/2015 | Murao | G06V 10/28 382/104 |
| 2019/0370574 | A1* | 12/2019 | Wang | G06F 18/24143 |

(Continued)

FOREIGN PATENT DOCUMENTS

| | | | | |
|---|---|---|---|---|
| CN | 106965739 | * | 7/2017 | G06V 10/761 |

OTHER PUBLICATIONS

Kogawahara, machine translation of CN106965739. (Year: 2017).*

*Primary Examiner* — Jacob S. Scott
*Assistant Examiner* — Michael E Butler
(74) *Attorney, Agent, or Firm* — Morgan, Lewis & Bockius LLP

(57) ABSTRACT

This application is directed to predicting vehicle turn and brake actions for at least partially autonomous vehicle driving. A first vehicle obtains a plurality of images along a road. For each image of the plurality of images, the first vehicle detects, from the image, a plurality of image regions each corresponding to a respective vehicle light of a second vehicle positioned on the road near the first vehicle. The first vehicle determines, for each image region, a probability that a respective vehicle light of the second vehicle changed its state. The first vehicle predicts a vehicle action of the second vehicle based on the probability for each image region. The first vehicle at least partially autonomously driving the first vehicle based on the predicted vehicle action of the second vehicle.

18 Claims, 14 Drawing Sheets

(56) References Cited

U.S. PATENT DOCUMENTS

2020/0234066 A1* 7/2020 Lee ................... G06V 10/25
2023/0322208 A1* 10/2023 Rojas ................ B60W 50/085
  701/41

* cited by examiner

TURN AND BRAKE ACTION PREDICTION USING VEHICLE LIGHT DETECTION

TECHNICAL FIELD

The present application generally relates to vehicle technology, and more particularly to, computer-aided methods and systems for predicting vehicle turning and braking actions by detecting vehicle lights, to facilitate autonomous vehicle control and/or planning.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving.

One of the key obstacles facing the autonomous vehicle industry is the complexity of predicting turn and/or brake actions for vehicles on the road. A conventional approach for predicting turn and brake actions of vehicles is by observing the motion of the vehicles themselves. However, there are several drawbacks to this approach, including its passive/reactive nature and its ability to infer vehicle turn and brake actions only after a vehicle has cut into the ego lane or has slowed down by a threshold amount.

Conventional neural network-based approaches for predicting vehicle turning and/or braking actions involve using images of entire vehicles as inputs to a time series deep learning model, such as a convolutional neural network (CNN) or a long short-term memory (LSTM) network, and obtaining from the model an output that directly predicts a turn action. The drawbacks of these conventional neural network-based approaches include high latency and the requirement for a huge amount of ground truth labeled data to ensure sufficient training. Not only that, but the trained model is also usually a "black box," as there is no way to determine which features of the vehicles the model uses to predict turn and brake actions. For example, it is unclear whether the model is predicting vehicle actions from the vehicle lights themselves, or the orientations of the vehicles, the orientations of vehicle tires, a change in distance or speed, etc.

As such, it is desirable to provide an improved system for predicting vehicle turning and braking that can be used by autonomous vehicles.

SUMMARY

This application is directed to methods, systems, and non-transitory computer readable storage media for predicting vehicle turning and braking actions using deep learning techniques.

Vehicle light patterns tend to be better predictors of vehicle turn and brake actions than vehicle and tire orientations, because operators of vehicles typically turn on the signal lights for a few seconds before starting a lane change or turn maneuver. The ability to accurately predict vehicle turn and brake actions results in improved road safety and fuel efficiency, and better operation of autonomous vehicles. For example, a vehicle that can predict actions (e.g., braking or switching lanes) of a second vehicle will be able to apply its brakes early and gradually even before the second vehicle starts to exhibit lateral motion towards the lane in which the ego vehicle is driving; this in turn reduces the likelihood of an accident and conserves fuel for the vehicle.

According to some aspects of the present disclosure, vehicle turning and braking actions can be predicted using a three-stage approach. The first stage uses images that are captured along a road as inputs and detecting, from the images, vehicle lights (e.g., turn signal lights or brake lights) of one or more obstacle vehicles along the road. The second stage compares the detected vehicle lights from the images, which are taken at different times, and determines whether a vehicle light status of an obstacle vehicle has changed (e.g., from an "on" state to an "off" state or vice versa). The third stage uses the vehicle light status that is determined from the second stage to predict a vehicle action of the obstacle vehicle. By doing so, an ego vehicle can predict the vehicle action of the obstacle vehicle before the obstacle vehicle takes any active step to implement the predicted vehicle action (e.g., turn, brake, cut-in), thereby allowing the ego vehicle to respond to the vehicle action in a prompt and accurate manner and enhancing overall road safety and fuel efficiency.

In one aspect, a method for predicting turning and braking actions of vehicles is implemented at a first vehicle including one or more processors and memory. The method includes obtaining a plurality of images along a road. The method includes, for each image of the plurality of images: detecting, from the image, a plurality of image regions each corresponding to a respective vehicle light of a second vehicle positioned on the road near the first vehicle; and determining, for each image region, a probability that a respective vehicle light of the second vehicle changed its state. The method further includes predicting a vehicle action of the second vehicle based on the probability for each image region and at least partially autonomously driving the first vehicle based on the predicted vehicle action of the second vehicle.

In some embodiments, the method further includes for each image of the plurality of images, applying a detection model to detect the plurality of image regions corresponding to a plurality of vehicle lights of the second vehicle and generate a respective bounding box around each respective vehicle light of the plurality of vehicle lights.

In some embodiments, the determining includes generating, for each image of the plurality of images, a composite image that includes the plurality of image regions. Each image region of the plurality of image regions corresponds to a respective vehicle light of the second vehicle.

In some embodiments, the determining includes comparing a first composite image generated from a first road image taken at a first time to a second composite image generated from a second road image taken at a second time. The second time is subsequent to the first time. The method further includes determining whether there are any differences in the first and second composite images. The differences are used to predict the vehicle action of the second vehicle.

In some embodiments, the method further includes applying a prediction model to predict the vehicle action of the second vehicle based on the probability of each image region. In some embodiments, the prediction model is a temporal convolution neural network. In some embodiments, the prediction model is a rule-based system that applies one or more predefined rules based on knowledge of a standard turn frequency (e.g., 1.5 Hz to 2.5 Hz) to predict the vehicle action of the second vehicle.

According to another aspect of the present application, a first vehicle includes one or more processing units and memory having a plurality of programs stored in the memory. The programs, when executed by the one or more processing units, cause the first vehicle to perform any of the methods for predicting turning and braking actions of vehicles as disclosed herein.

According to another aspect of the present application, a non-transitory computer readable storage medium stores a plurality of programs configured for execution by a first vehicle having one or more processing units. The programs, when executed by the one or more processing units, cause the first vehicle to perform any of the methods for predicting turning and braking actions of vehicles as disclosed herein.

BRIEF DESCRIPTION OF DRAWINGS

The accompanying drawings, which are included to provide a further understanding of the embodiments, are incorporated herein, constitute a part of the specification, illustrate the described embodiments, and, together with the description, serve to explain the underlying principles.

Like reference numerals refer to corresponding parts throughout the several views of the drawings.

DETAILED DESCRIPTION

Figure 1:
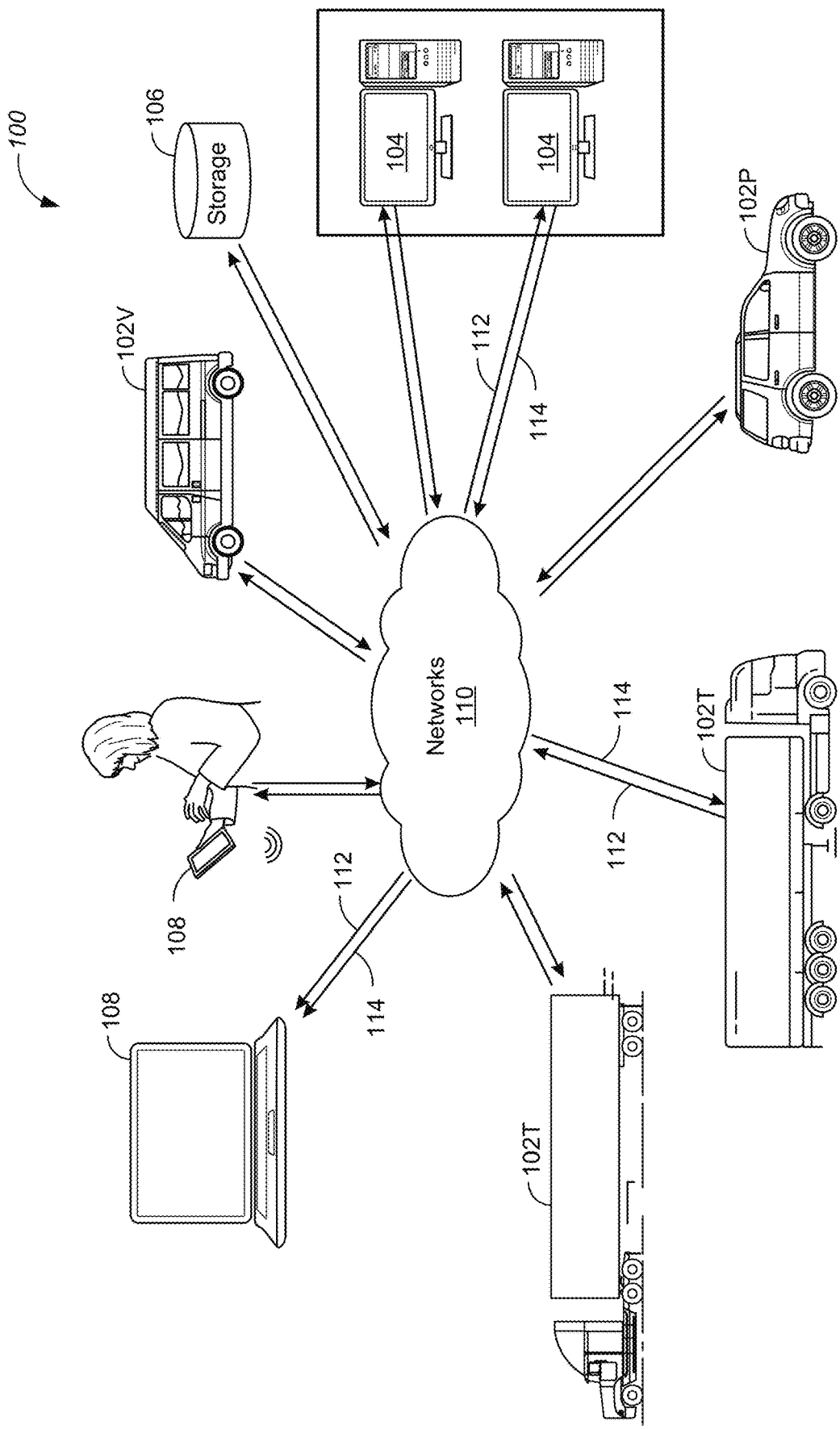
FIG. 1 is an example vehicle driving environment for a plurality of vehicles, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to predicting a vehicle action of a vehicle by detecting the vehicle lights of the vehicle and analyzing associated vehicle light state changes. Exemplary vehicle actions can include braking, stopping, turning, switching lanes, or entering or exiting a freeway. In some embodiments, a first vehicle obtains a plurality of images along a road. In some embodiments, the first vehicle (e.g., an ego vehicle) includes one or more cameras for obtaining the images. In some embodiments, for each image of the plurality of images, the first vehicle detects, from the image, a plurality of image regions each corresponding to a respective vehicle light of a second vehicle positioned on the road near the first vehicle. In an example, the second vehicle includes an obstacle vehicle that appears in a field of view of the ego vehicle.

In some embodiments, a detection model is applied to detect the plurality of image regions corresponding to a plurality of vehicle lights of the second vehicle and generate a respective bounding box around each respective vehicle light of the plurality of vehicle lights. In some embodiments, the detection model classifies each of the respective plurality of vehicle lights to have a classification selected from the group consisting of: a left vehicle light, a right vehicle light, and a middle vehicle light. In some embodiments, the first vehicle determines, for each image region, a probability that a respective vehicle light of the second vehicle changed its state. In some embodiments, for each image of the plurality of images, a composite image is generated to include the plurality of image regions. Each image region of the plurality of image regions corresponds to a respective vehicle light of the second vehicle. In some embodiments, the first vehicle predicts a vehicle action of the second vehicle based on the probability for each image region.

In some embodiments, the first vehicle compares a first composite image generated from a first road image taken at a first time to a second composite image generated from a second road image taken at a second time subsequent to the first time to determine whether there are any differences in the first and second composite images, and uses the differences to predict the vehicle action of the second vehicle. In some embodiments, a time difference between the first time and the second time is determined based on a standard frequency of vehicle light changes of vehicles. In some embodiment, the time difference between the first time and the second time falls within a range of about 0.2 seconds to about 0.5 seconds. In some embodiments, a prediction model is applied to predict the vehicle action of the second vehicle based on the probability of each image region. In some embodiments, the prediction model is a temporal convolution neural network, e.g., configured to process a temporal sequence of probabilities associated with each image region. In some embodiments, the prediction model is a rule-based system that applies one or more predefined rules based on knowledge of a standard turn frequency (e.g., 1.5 Hz to 2.5 Hz) to predict the vehicle action of the second vehicle. In some embodiments, the first vehicle is at least partially autonomously driven based on the predicted vehicle action of the second vehicle.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
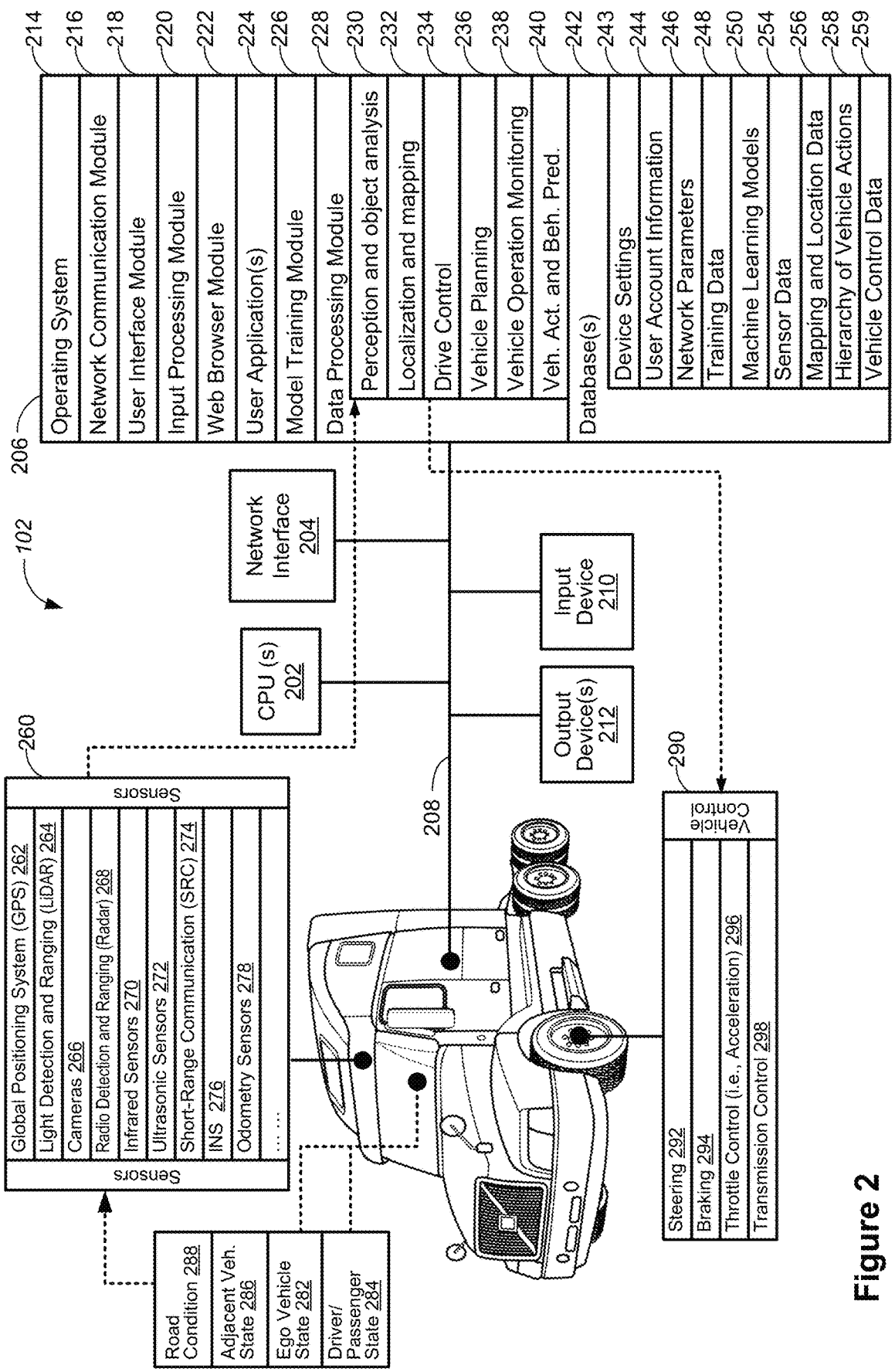
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102; a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;
- a vehicle database 242, which stores vehicle data 112, including:
    - device settings 243, including common device settings (e.g., service tier, device model, storage capacity, processing capabilities, communication capabilities, and/or medical procedure settings) of the vehicle 102;
    - user account information 244 for the one or more user applications 224 (e.g., user names, security questions, account history data, user preferences, and predefined account settings);

network parameters 246 for the one or more communication networks 110, (e.g., IP address, subnet mask, default gateway, DNS server, and host name);

training data 248 for training the machine learning model 250;

machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;

sensor data 254 captured or measured by the plurality of sensors 260;

mapping and location data 256, which is determined from the sensor data 254 to map the vehicle driving environment 100 and locations of the vehicle 102 in the environment 100;

a hierarchy of interconnected vehicle actions 258 including a plurality of predefined vehicle actions that are organized to define a plurality of vehicle action sequences; and vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
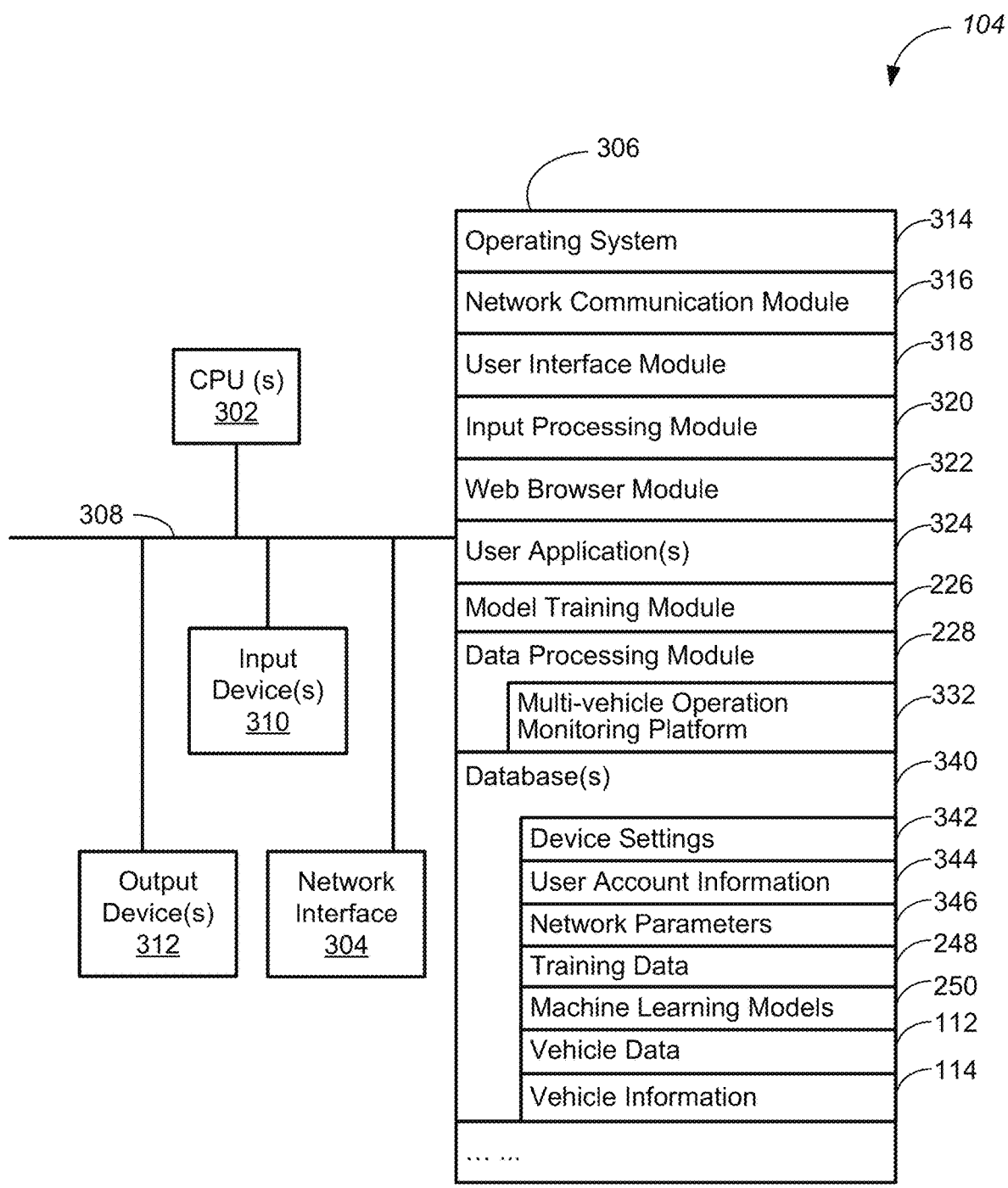
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a machine learning model 250, where the model 250 includes at least one neural network and is applied to process vehicle data (e.g., sensor data and vehicle control data) of one or more vehicles 102;

a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);

vehicle server data 340, including:
device settings 342, which include common device settings (e.g., service tier, device model, storage capacity, processing capabilities, communication capabilities, and/or medical procedure settings) of the server 104;

user account information 344 for the one or more user applications 324 (e.g., user names, security questions, account history data, user preferences, and predefined account settings);

network parameters 346 for the one or more communication networks 110, (e.g., IP address, subnet mask, default gateway, DNS server, and host name);

training data 248 for training the machine learning model 250;

machine learning models 250 for processing vehicle data;

vehicle data 112, which is collected from a plurality of vehicles 102 and includes sensor data 254, mapping and location data 256, and vehicle control data 259; and additional vehicle information 114, including vehicle operation information, fault information, and/or driving solution information, which are generated from the collected vehicle data 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
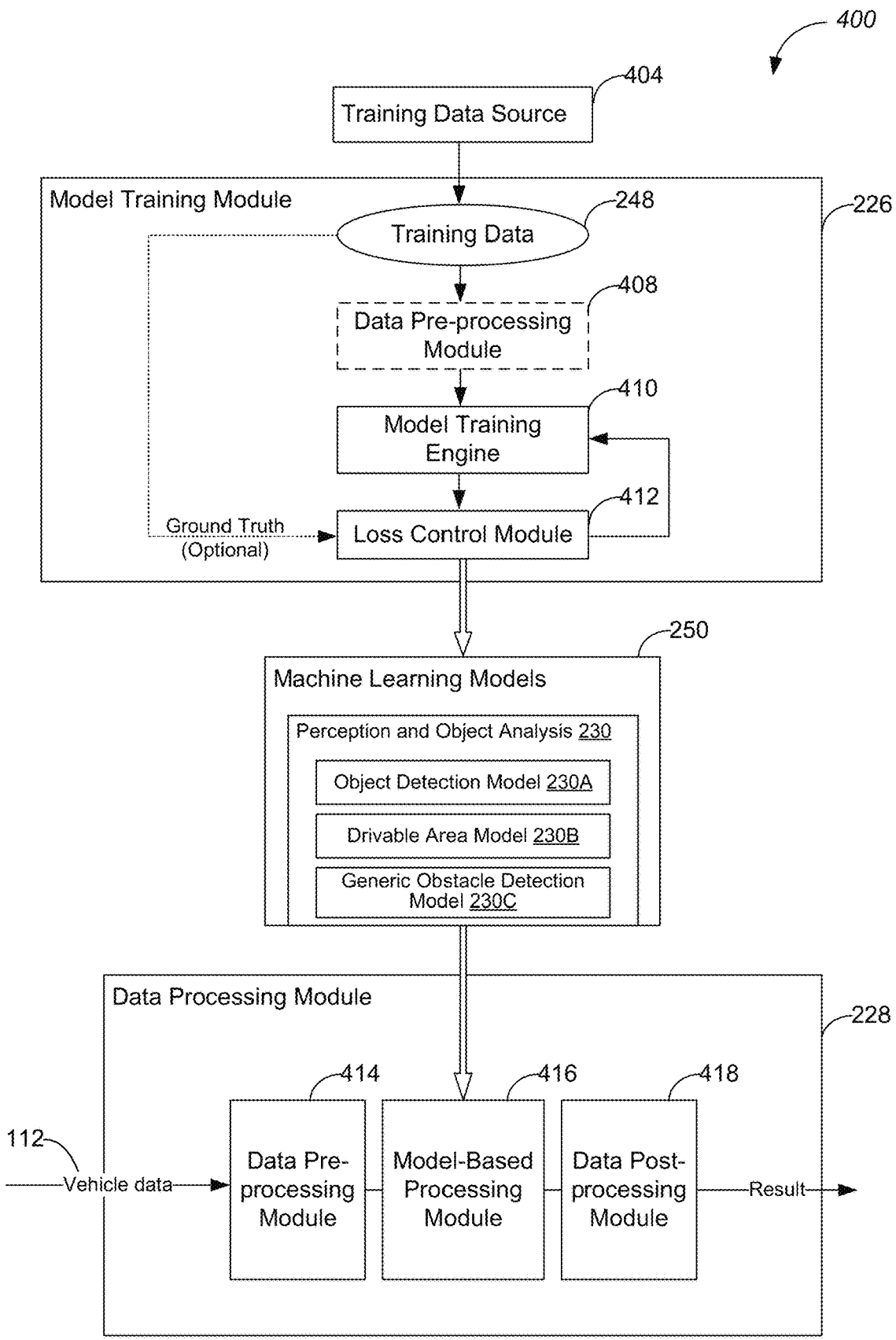
FIG. 4 is a block diagram of a machine learning system for training and applying vehicle data processing models for facilitating at least partial autonomous driving of a vehicle, in accordance with some embodiments.
Figure 5A:
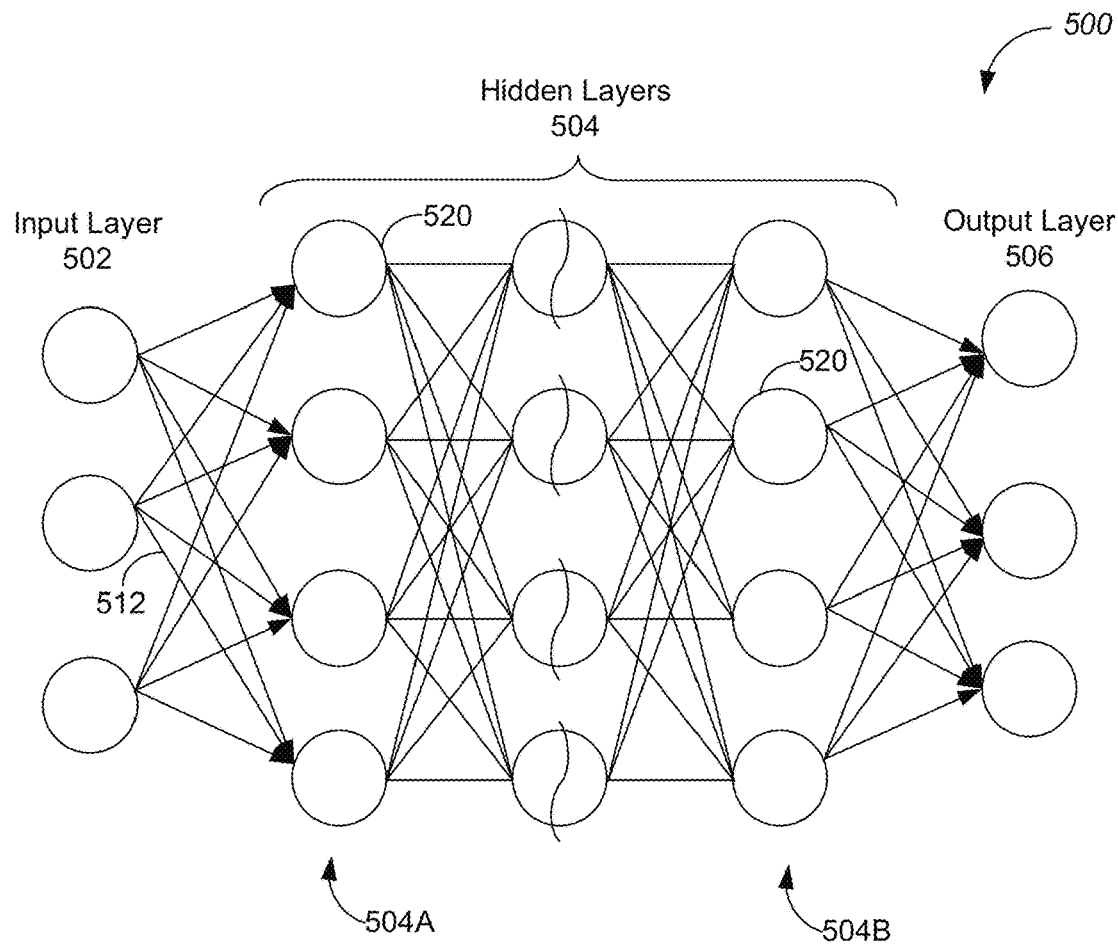
FIG. 5A is a structural diagram of an example neural network applied to process vehicle data in a vehicle data processing model, in accordance with some embodiments.
Figure 5B:
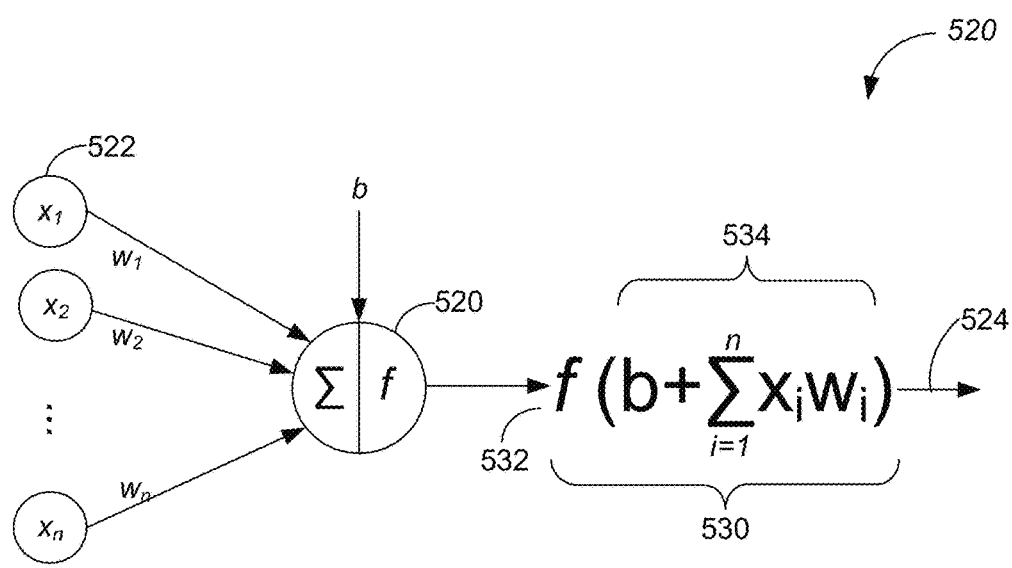
FIG. 5B is an example node in the neural network, in accordance with some embodiments.
Figure 6A:
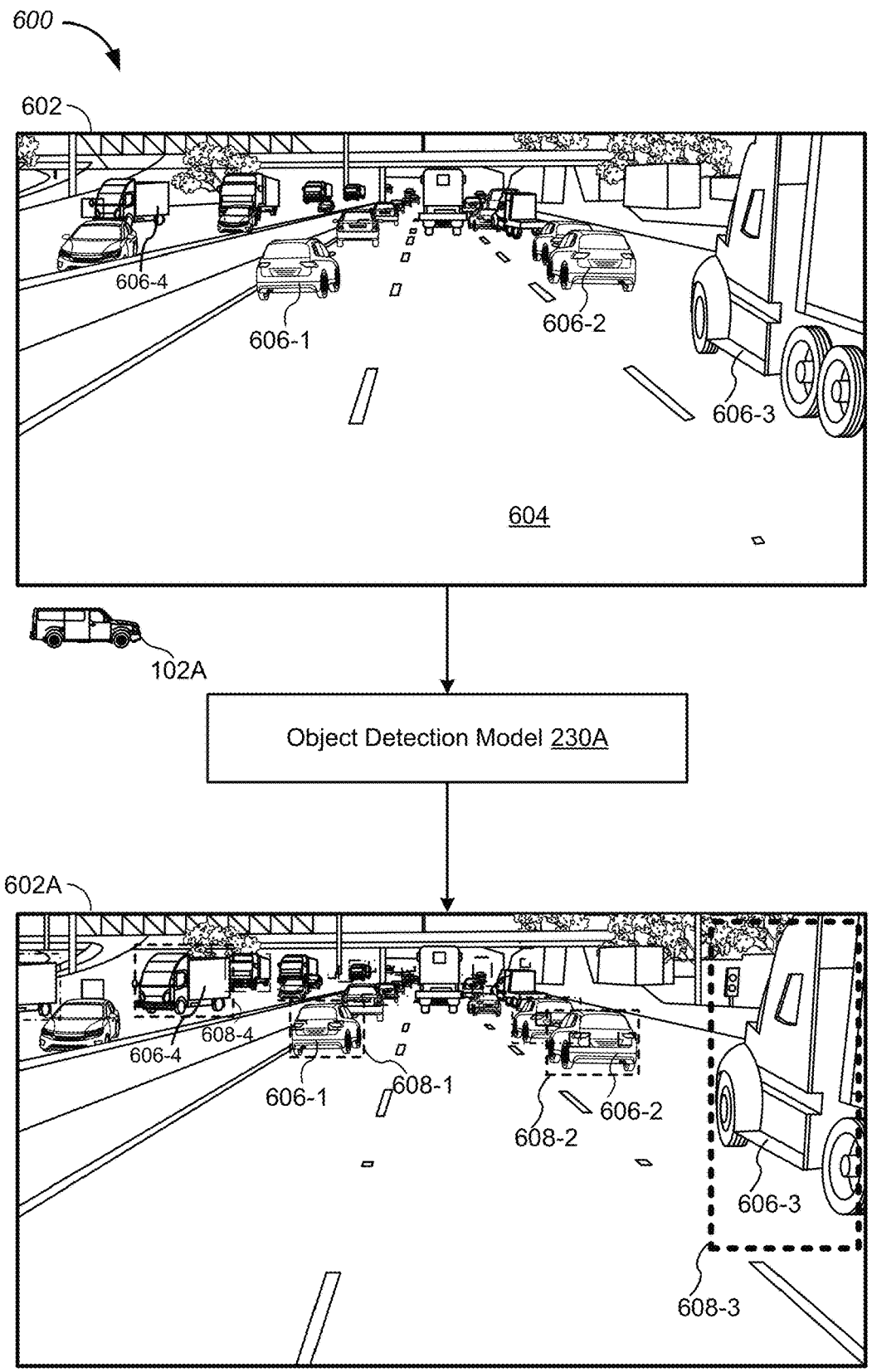
FIG. 6A illustrates an exemplary process for detecting from an image a plurality of image regions each corresponding to a respective vehicle light of a second vehicle, in accordance with some embodiments.
Figure 6B:
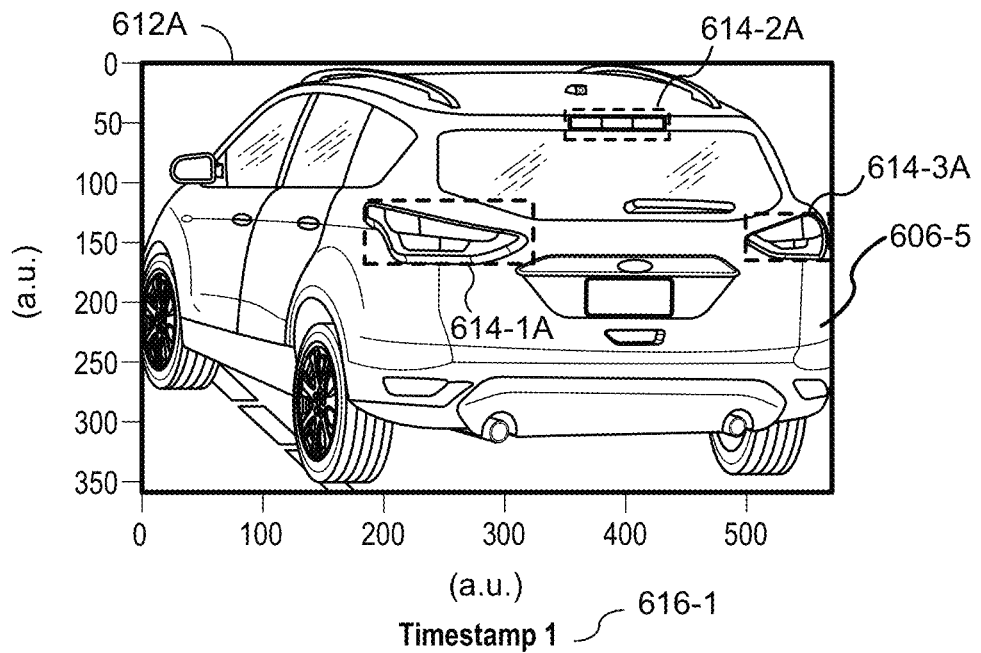
FIG. 6B are example partial views of images obtained at two different timestamps, in accordance with some embodiments.
Figure 6B:
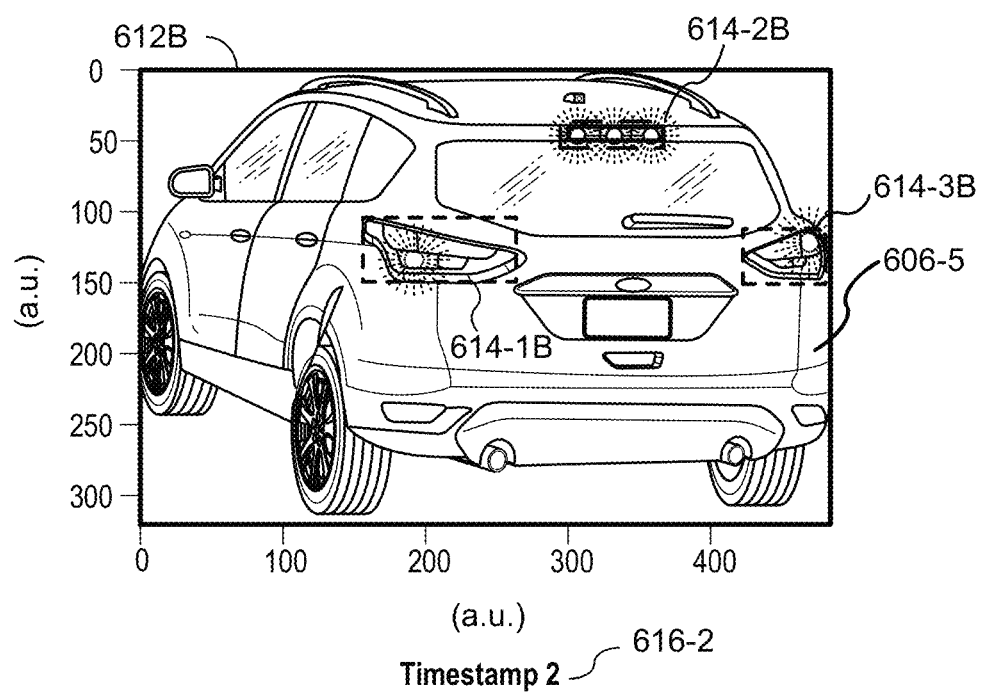

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Some embodiments of the present disclosure are implemented at a first vehicle (e.g., vehicle 102) and are directed to methods, systems, and devices for predicting a vehicle action of a second vehicle using information from the vehicle lights (e.g., front lights, tail lights, or brake lights) of the second vehicle. Exemplary vehicle actions that can be predicted include vehicle braking, turning, stopping, changing lanes, or entering or exiting a highway.

In some embodiments, a vehicle action of the second vehicle can be predicted using a three-stage approach. The first stage uses time-series images as inputs and detects vehicle lights of vehicles in the images. The second stage compares images of the detected vehicle lights at different timestamps and determines (e.g., predicts) a probability that a respective vehicle light of the second vehicle changed its state during a time interval corresponding to two images. In some embodiments, the determined probability includes a first probability that a respective light has changed from an "on" state to an "off" state, a second probability that the respective light has changed from an "off" state to an "on" state, and/or a third probability that the respective light has experienced no change in state. The third stage predicts a vehicle action of the second vehicle based determined probabilities from the second stage.

FIG. 6A illustrates an exemplary process 600 for detecting from an image a plurality of image regions each corresponding to a respective vehicle light, in accordance with some embodiments. The process 600 is implemented by a first vehicle 102A (e.g., in FIG. 6) having one or more processors (e.g., processing unit(s) 202 in FIG. 2) and memory (e.g., memory 206 in FIG. 2). In some embodiments, the first stage 600 includes obtaining time-series images of a road along which the first vehicle 102A is traveling, and inputting the time-series images into an object detection model 230A that is configured to detect vehicle lights of vehicles. As explained above, a vehicle 102 has a plurality of sensors 260 including one or more cameras 266. In some embodiments, when the vehicle 102 drives on a road, a forward-facing camera 266 captures one or more images (or a series of images) along the road. In some embodiments, the images are processed to identify one or more features on the road. For example, in some embodiments, the object detection model 230A is applied to identify one or more identifiable objects (e.g., known objects) on the road surface. The object detection model 230A is trained to detect objects that belong to a predefined set of classes (e.g., known classes), such as vehicles, lane lines, traffic lights, cones, pedestrians, and bicycles.

FIG. 6A illustrates an example image 602 that is captured by the first vehicle 102A and input into an object detection model 230A, in accordance with some embodiments. The image 602 includes a forward-facing view of a road along which the first vehicle 102 is traveling. The image 602 includes a road surface 604 and vehicles 606 (e.g., vehicle 606-1 to vehicle 606-4) on the road surface. In some embodiments, the vehicles 606 are identifiable objects (e.g., with belonging to a respective predefined class) that can be detected or classified by the object detection model 230A. In some embodiments, the detection model 230A identifies one or more identifiable objects (e.g., vehicles 606) and generates one or more bounding boxes 608 around the one or more identifiable objects. FIG. 6A illustrates an example image 602A, corresponding to the image 602, after it has been processed by the object detection model 230A. In some embodiments, the object detection model 230A generates a bounding box 608 for a respective one of the identifiable objects 606 in the image 602A. For example, a bounding box 608-1 is generated around the vehicle 606-1, a bounding box 608-2 is generated around the vehicle 606-2, a bounding box 608-3 is generated around the vehicle 606-3, and a bounding box 608-4 is generated around the vehicle 606-4.

In some embodiments, the object detection model 230A is trained to detect vehicle lights (e.g., front lights, tail lights, or brake lights) of vehicles using training images with labeled vehicle lights. In some embodiments, the object detection model 230A generates one or more bounding boxes 614 for a respective one of the vehicle lights in the image. FIG. 6B illustrates a partial view of an image 612A obtained at a first time (e.g., having timestamp 1 616-1) that includes a vehicle 606-5. FIG. 6B also illustrates a partial view of an image 612B obtained at a second time (e.g., having timestamp 2 616-2) the includes the same vehicle 606-5. In some embodiments, the object detection model 230A generates bounding boxes 614-1A, 614-1B, and 614-1C corresponding to vehicle lights of the vehicle 606-5, in the image 612A. In some embodiments, the object detection model 230A generates bounding boxes 614-1A, 614-1B, corresponding to the vehicle lights of the vehicle 606-5, in the image 612B. In some embodiments, the object detection model 230A classifies a respective vehicle light to have a classification selected from the group consisting of: a left vehicle light, a right vehicle light, and a middle vehicle light. For example, the object detection model 230A classifies the vehicle light corresponding to the bounding boxes 614-1A and 614-1B as a left vehicle light (e.g., left tail light), classifies the vehicle light corresponding to the bounding boxes 614-2A and 614-2B as a middle vehicle light (e.g., middle tail light), and classifies the vehicle light corresponding to the bounding boxes 614-3A and 614-3B as a right vehicle light (e.g., right tail light).

Figure 7:
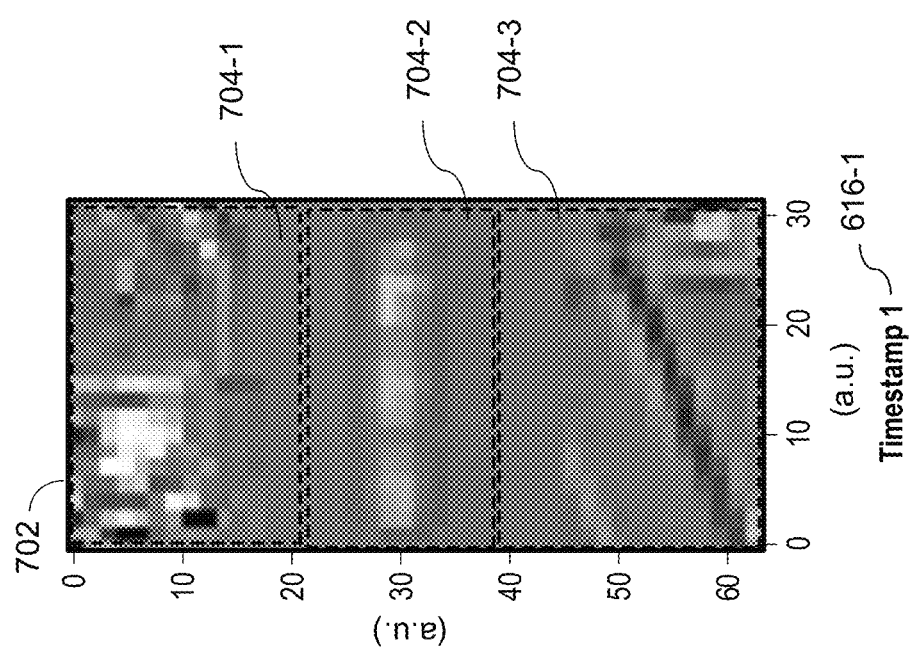
FIG. 7 is an example composite image, in accordance with some embodiments.

FIG. 7 illustrates an example composite image 702 generated by the first vehicle 102A and corresponding to a timestamp 616-1 (e.g., timestamp 1), in accordance with some embodiments. In some embodiments, the first vehicle 102A generates, for each image of the time-series images, a composite image including the composite image 702 corresponding to the timestamp 616-1. In some embodiments, the composite image 702 is generated by concatenating the bounding boxes 614 corresponding to the vehicle lights. In some embodiments, the composite image 702 includes one or more image regions 704. Each respective image region 704 corresponds to a respective vehicle light of the second vehicle. For example, in FIG. 7, the composite image 702 includes an image region 704-1 corresponding to the left vehicle light of the second vehicle, an image region 704-2 corresponding to the middle vehicle light of the second vehicle, and an image region 704-3 corresponding to the right vehicle light of the second vehicle. In some embodiments, the composite image 704 consists of one (and only one) image region, corresponding to one vehicle light of the second vehicle. In some embodiments, the composite image 704 consists of two image regions corresponding to two vehicle lights (e.g., left and right vehicle lights, left and middle vehicle lights, or middle and right vehicle lights).

Figure 8A:
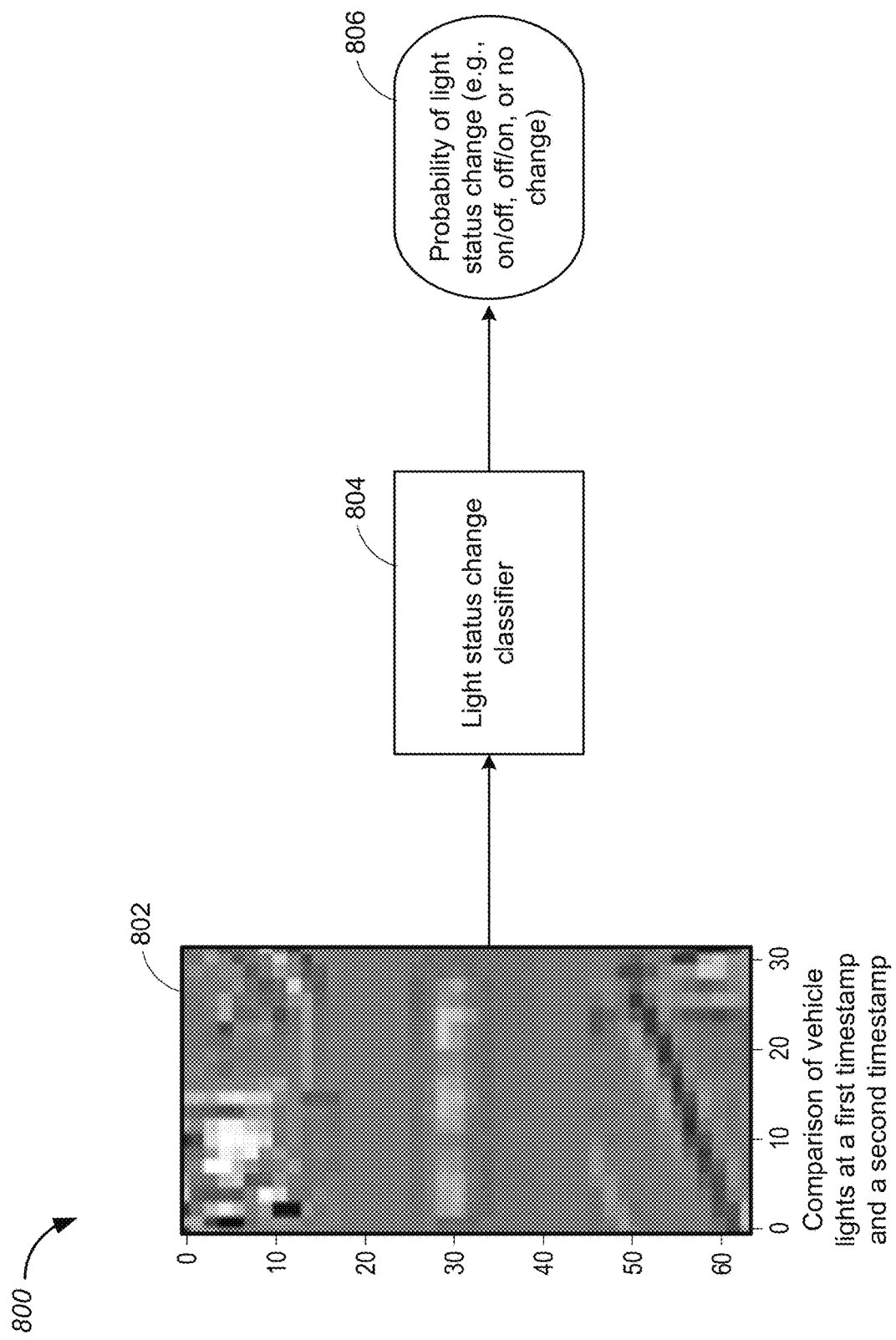
FIG. 8A illustrates an exemplary process for determining, for each image region, a probability that a respective vehicle light of a second vehicle changed its state, in accordance with some embodiments.

FIG. 8A illustrates an exemplary process 800 for determining, for each image region 704, a probability that a respective vehicle light of a second vehicle changed its state, in accordance with some embodiments. In some embodiments, the process 800 includes applying a light status change classifier 804 to determine, based on composite images (e.g., composite image 704) generated from the time-series images, respective probabilities 806 that a respective vehicle light of the second vehicle has changed its state. In some embodiments, the light status change classifier 804 is obtained by training, using machine learning, a classification model using training images labeled with vehicle light states (e.g., vehicle light statuses, e.g., light on or off).

In some embodiments, the light status change classifier 804 uses as input, a comparison image 802 that compares a first composite image generated from a first image taken at a first time (e.g., timestamp 1 616-1) to a second composite image generated from a second image taken at a second time (e.g., timestamp 2 616-2) subsequent to the first time, to determine whether there are any differences in the first and second composite images, and uses the differences to predict a vehicle action of the second vehicle. In some embodiments, the comparison image 802 is generated by determining differences associated with each image region 704, corresponding to a respective vehicle light of the second vehicle, in the first and second composite images. In some embodiments, the comparison image 802 is generated by subtracting pixel values of the second composite image from corresponding pixel values of the first composite image, for a red component, a green component, and/or a blue component (e.g., RGB components) of the first and second composite images.

In some embodiments, the light status change classifier 804 assigns, to a respective image region 704 of the comparison image 802, a first probability value corresponding to a change in state of the respective vehicle light from a first state to a second state (e.g., on to off); a second probability value corresponding to a change in state of the respective vehicle light from the second state to the first state (e.g., off to on); and a third probability value corresponding to no change in state of the respective vehicle light. The sum of the first probability value, the second probability value, and the third probability value equals to one.

In some situations, the vehicle moves from a more shaded area to a less shaded area (or vice versa) during the time interval between the two image frames. The comparison image 802 indicates a difference of the intensities of vehicle lights between two image frames. The light status change classifier 804 may mistakenly predict, based on differences in intensities of the two images, that a light status of a vehicle light has changed (e.g., from an on state to an off state), when the differences in intensities are image artifacts that resulted from the different lighting conditions. Accordingly, in some embodiments, the first vehicle 102A may perform intensity (e.g., gray level) normalization for each image of the time series image prior to generating the composite image 702 and the comparison image 802, so as to reduce or eliminate image artifacts.

In some embodiments, the time difference between the first time and the second time is determined based on a standard frequency of vehicle light changes of vehicles. For example, the Society of Automotive Engineers (SAE) standard J1690, the Federal Motor Vehicle Safety Standard (FMVSS) 108, and the International Electrotechnical Commission (IEC) Standard 60809, which regulate automotive lighting and signaling devices, require turn signals to blink on and off (e.g., flash) at a steady rate of between 60-120 flashes per minute (or 1-2 Hz). Thus, specifying a time difference between the first time (e.g., timestamp 1 616-1) and the second time (e.g., timestamp 2 616-2) to have a range of about 0.2 seconds to about 0.5 seconds can guarantee that the process 800 will detect status transitions or changes for a respective vehicle light of the second vehicle (e.g., from an "on" state to an "off" state or vice versa).

Figure 8B:
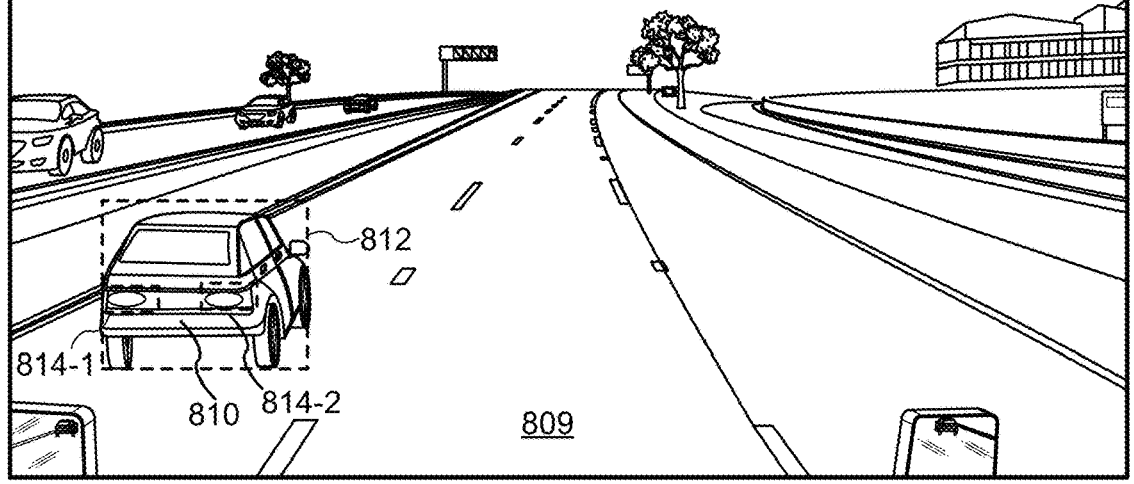
FIGS. 8B and 8C illustrate two road images, in accordance with some embodiments.
Figure 8B:

FIG. 8B is a road image 808 acquired at timestamp 811, in accordance with some embodiments. The road image 808 includes a vehicle 810 that is adjacent to an ego lane 809 of the first vehicle 102A. In some embodiments, the first vehicle 102A generates a bounding box 812 around the vehicle 810. In some embodiments, the first vehicle 102A generates one or more bounding boxes 814 around one or more respective vehicle lights of the vehicle 810. For example, in FIG. 8B, a bounding box 814-1 is generated around a left tail light of the vehicle 810 and a bounding box 814-2 is generated around a right tail light of the vehicle 810.

In some embodiments, the first vehicle 102A (e.g., light change classifier 804) outputs probabilities that the vehicle light status of the vehicle 810 has changed. in the example of FIG. 8B, the light status change classifier 804 outputs (812), for the left tail light, a probability value (e.g., 0.2) corresponding to a change in state of the left tail light from an off state to an on state during a first predefined time interval (e.g., timestamp 811 minus 0.2 sec, timestamp 811 minus 0.3 sec, timestamp 811 minus 0.4 sec, or timestamp 811 minus 0.5 sec), a probability value (e.g., 0.25) corresponding to a change in state of the left tail light from an on state to an off state during the first predefined time interval, and a probability value (e.g., 0.55) corresponding to no change in state of the left tail light during the first predefined time interval. In some embodiments, the light status change classifier 804 outputs (812), for the right tail light, a probability value (e.g., 0.2) corresponding to a change in state of the right tail light from an off state to an on state during the first predefined time interval (e.g., about 0.2 to 0.5 sec), a probability value (e.g., 0.15) corresponding to a change in state of the right tail light from an on state to an off state during the first predefined time interval, and a probability value (e.g., 0.65) corresponding to no change in state of the right tail light during the first predefined time interval.

Figure 8C:
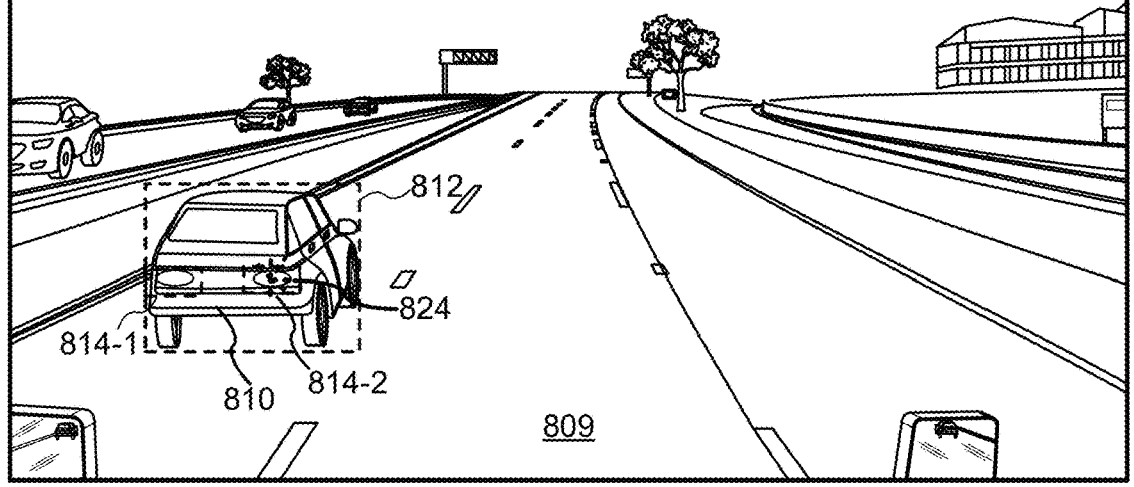

FIG. 8C is another road image 822, acquired at timestamp 828, that includes probability values output by the process 800, in accordance with some embodiments. The road image 822 also includes the vehicle 810. In FIG. 8C, the vehicle 810 includes a flashing (824) right tail light. In some embodiments, the light status change classifier 804 output (826), for the right tail light, a probability value (e.g., 0.65) corresponding to a change in state of the right tail light from an off state to an on state during a second predefined time interval (e.g., timestamp 828 minus 0.2 sec, timestamp 828 minus 0.3 sec, timestamp 828 minus 0.4 sec, or timestamp 828 minus 0.5 sec), a probability value (e.g., 0.15) corresponding to a change in state of the right tail light from an on state to an off state during the second predefined time interval, and a probability value (e.g., 0.2) corresponding to no change in state of the right tail light during the second predefined time interval.

In some embodiments, the process 800 is applied to determine respective probabilities of light change status of a second vehicle that is proximate to the first vehicle 102A. The proximity of the second vehicle is more likely to impact the partial autonomous driving decision of the first vehicle compared to other vehicles that are further away from the first vehicle 102A. For example, in some embodiments, the first vehicle 102A is traveling on an ego lane and the second vehicle is traveling on a lane adjacent to the ego lane. In some embodiments, the second vehicle is positioned on the road ahead of the first vehicle 102A, to the side of the first vehicle 102A, or immediately behind the first vehicle 102A.

Figure 9:
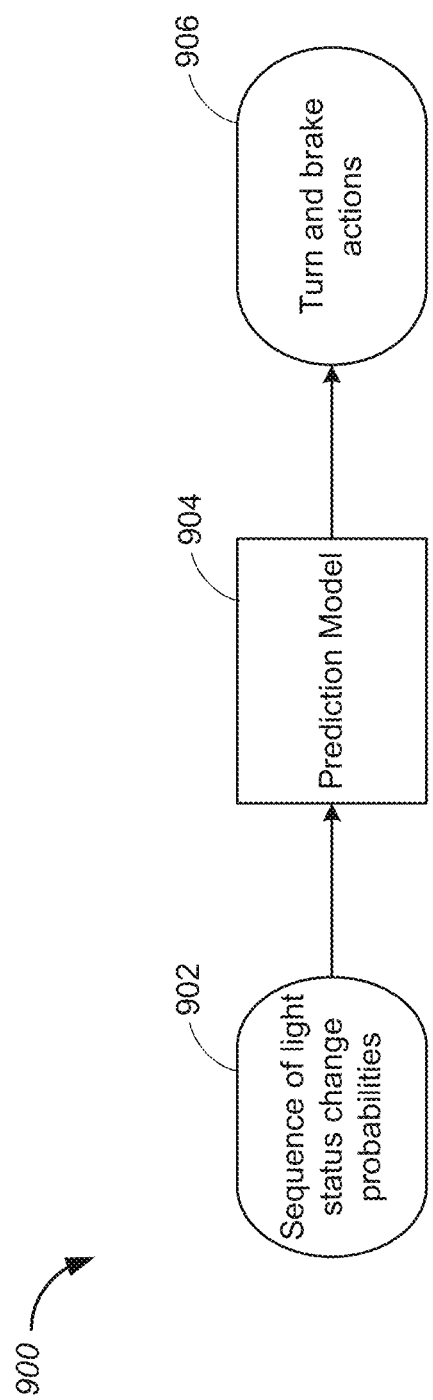
FIG. 9 illustrates an exemplary process for predicting a vehicle action of a second vehicle based on a probability for each image region, in accordance with some embodiments.

FIG. 9 is a flow diagram of an exemplary process 900 for predicting a vehicle action of a second vehicle based on a probability for each image region, in accordance with some embodiments. In some embodiments, the process 900 includes applying a prediction model 904 that uses a sequence 902 of light status change probabilities (e.g., obtained from 806) as inputs and outputs a turn and brake action 906 (e.g., a predicted vehicle action) of the second vehicle.

Figure 10:
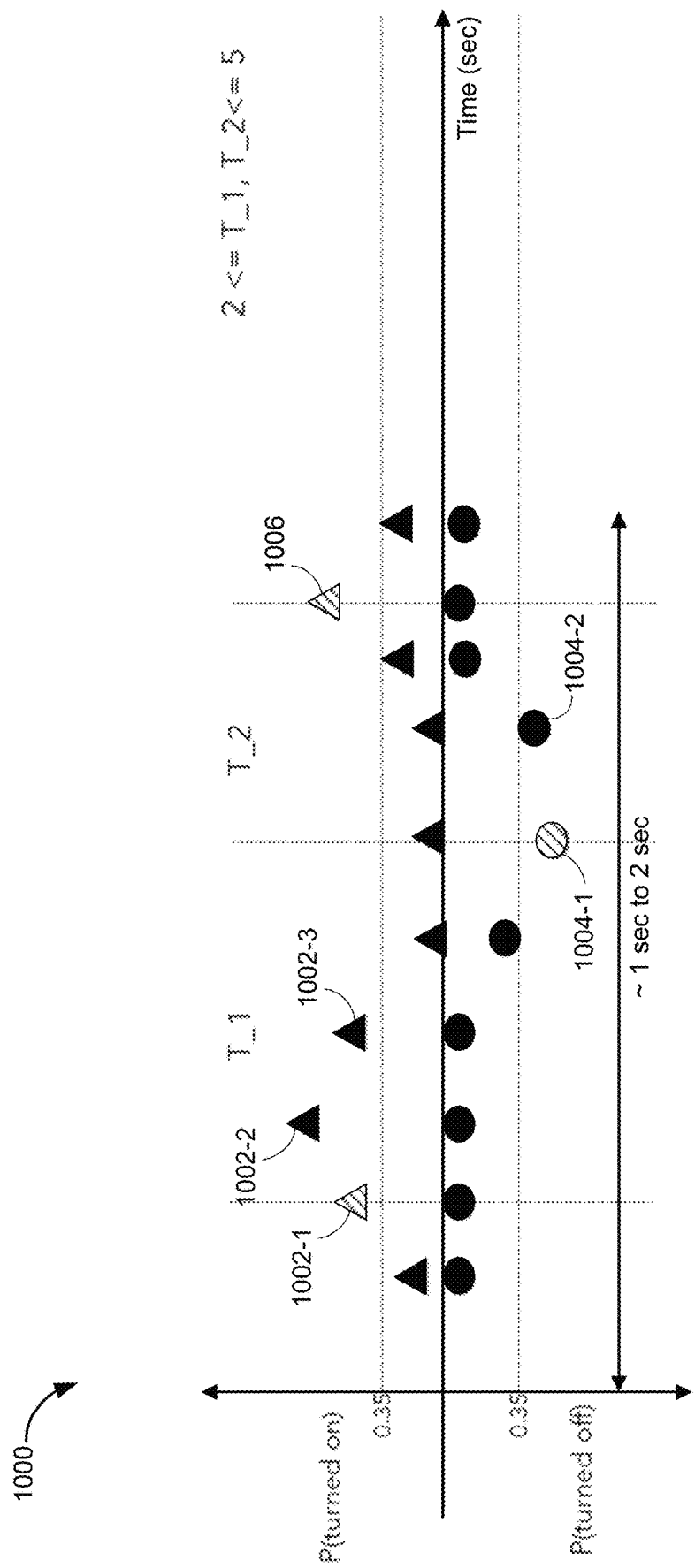
FIG. 10 illustrates a graph that includes a sequence of light status change probabilities for a vehicle light, in accordance with some embodiments.

FIG. 10 is a graph 1000 that includes a sequence of light status change probabilities for a vehicle light (e.g., left vehicle light, middle vehicle right, or right vehicle light) of a second vehicle, in accordance with some embodiments. In FIG. 10, each of the triangles represents a respective probability that the vehicle light is turned on (e.g., whose status changed from off to on) and each dot represents a probability that the vehicle light is turned off (e.g., whose status changed from on to off). In some embodiments, by examining the probabilities over a time span of 1 to 2 seconds, the prediction model 904 identifies patterns in the vehicle light behavior to determine whether the vehicle light has changed its status. In some embodiments, the prediction model 904 determines a turn and brake action 906 of the second vehicle by looking for an ON-OFF-ON or an OFF-ON-OFF pattern in the light status change probabilities. For example, in FIG. 10, the graph 1000 shows three consecutive data points 1002-1, 1002-2, 1002-3 where the probability that the vehicle light is turned on exceeds 0.35. This is followed by two consecutive data points 1004-1 and 1004-2 wherein the probability that the vehicle light is turned off exceeds 0.35, followed by another data point 1006 where the probability that the vehicle light is turned on exceeds 0.35. In some embodiments, the prediction model 904 may determine that the pattern in the graph 1000 corresponds to an ON-OFF-ON pattern.

Stated another way, in some embodiments, the prediction model is a rule-based system that applies one or more predefined rules based on knowledge of a standard turn frequency to predict the vehicle action of the second vehicle. A time gap is counted, e.g., a number of frames, between two successive model output switching events (e.g., between an on-to-off switching event and a following off-to-on switching event, between an off-to-on switching event and a following on-to-off switching event). Based on a predefined rule, if the time gap is between 2 and 5 frames (e.g., corresponding to 0.2 s-0.5 s) for the two successive model output switching events, the second vehicle captured in the plurality of images has an indicator signal activated and intends to make a left or right turn. In an example not shown, a turn signal flashes with a frequency of 1.66 Hz, and detected to be on for 3 successive frames and off for 3 successive frame. A light pattern is "off, off, off, on, on, on, off, off, off, on, on, on." A model output is "no_change, turned_off, no_change, turned_on, turned_on, no_change, no_change, turned_off, turned_off, no_change, turned_on, turned_on." In some embodiments, the model output is represented as a vector, [0 −1 0 1 1 0 0 −1 −1 0 1 1], where the values of −1, 0, and 1 represent "turned_off," "no_change," and "turned_on," respectively. In case of consecutive outputs of "turned-on," a time gap is measured to or from the first occurrence of the consecutive outputs of "turned-on." In this example, a first time gap is between frame 2 and frame 4, and corresponds to a time gap of 2 frames. A second time gap is between frame 4 and frame 8, and corresponds to a time gap of 4 frames. A third time gap is between frame 9 and frame 11, and corresponds to a time gap of 2 frames. In accordance with the predefined rule, the first vehicle predicts that the second vehicle will make a left or right turn based on the first, second, and/or third time gaps, where the left or right turn is determined based on which one of the image regions provides the corresponding model output.

Figure 11:
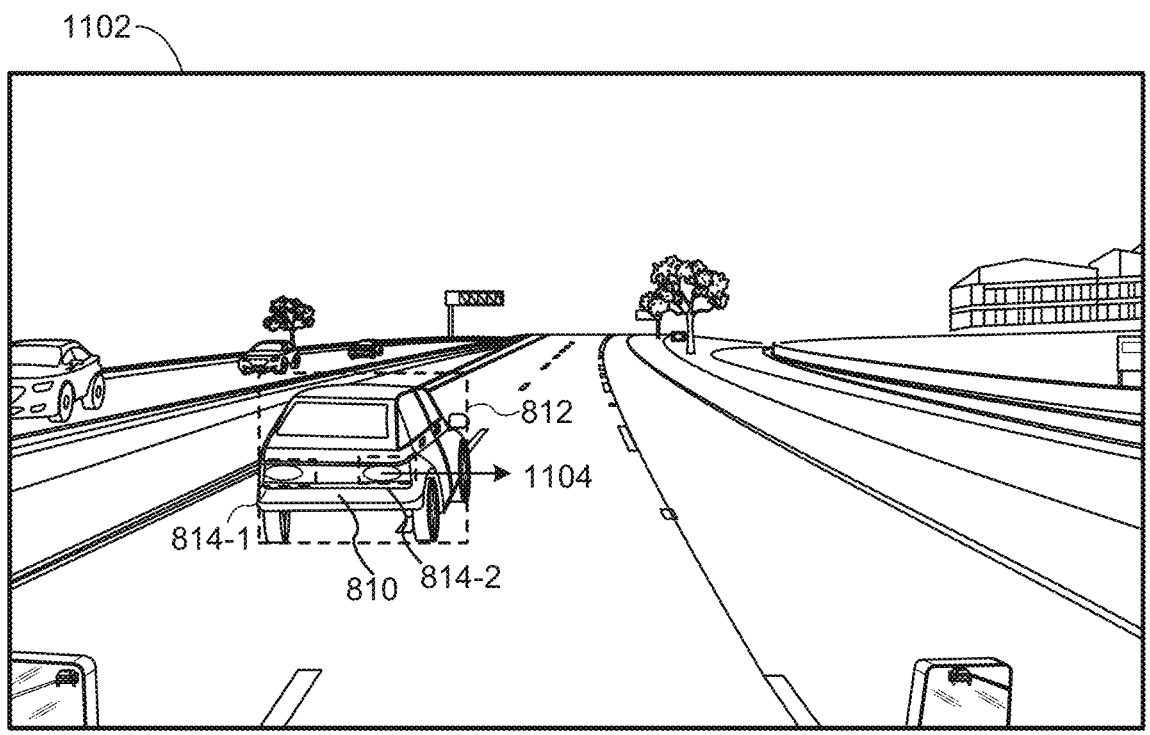
FIG. 11 illustrates an example road image, in accordance with some embodiments.

FIG. 11 is an example road image 1102 that includes the vehicle 810 (e.g., in FIGS. 8B and 8C), in accordance with some embodiments. In some embodiments, in accordance with a determination that a vehicle action corresponds to a lane switching (e.g., turning) action, the prediction model 904 outputs an indicator 1104 (e.g., an arrow) next to a respective vehicle light, to indicate the predicted vehicle action (e.g., predicted intent) of the vehicle 810.

Figure 12:
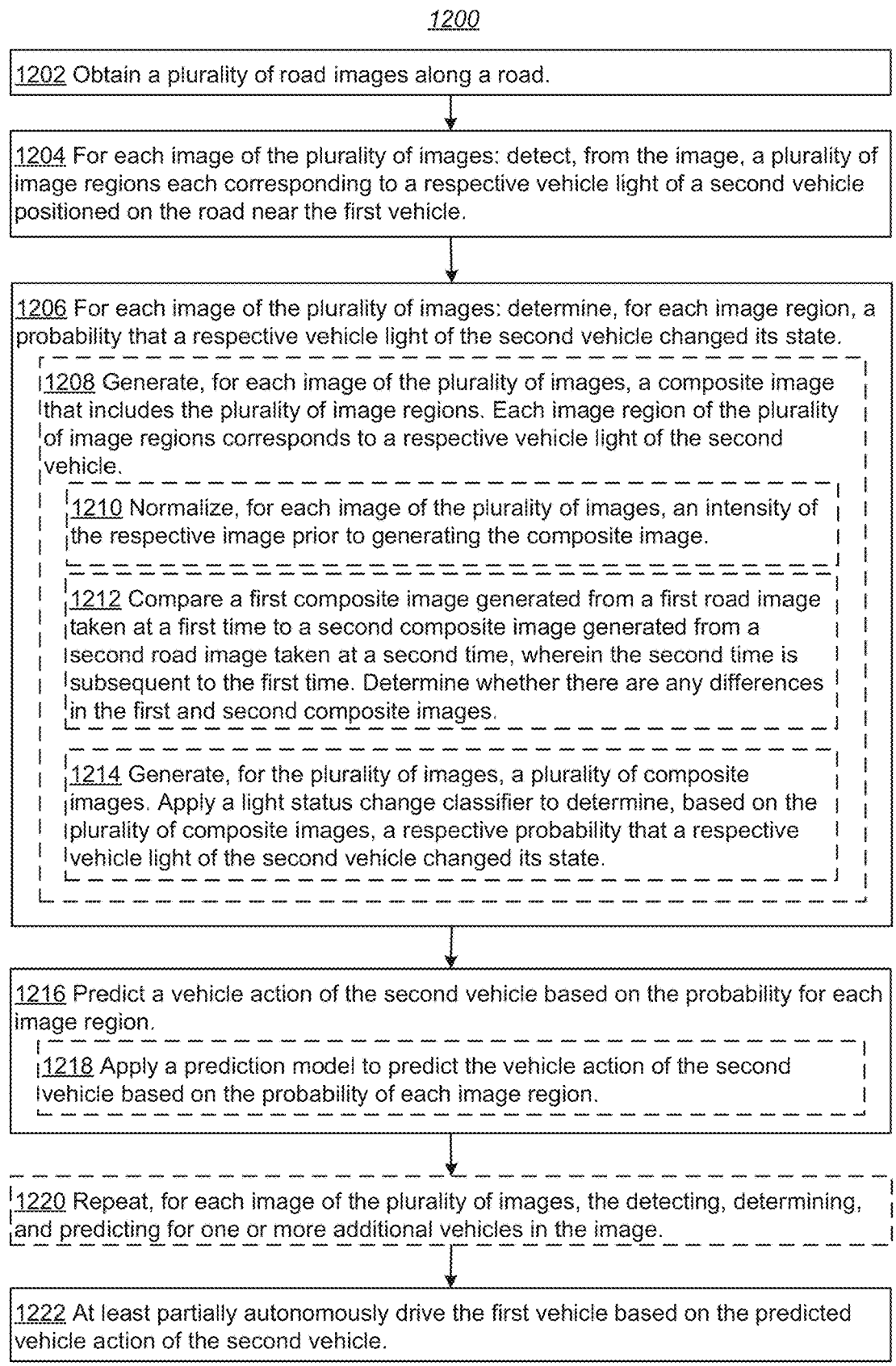
FIG. 12 illustrates a flow diagram of an example method for predicting turning and braking actions of vehicles, in accordance with some embodiments.

FIG. 12 illustrates a flow diagram of an example method 1200 for predicting turning and braking actions of vehicles, in accordance with some embodiments. In some embodiments, the method 1200 is performed at a first vehicle (e.g., first vehicle 102A) having one or more processors (e.g., processing unit(s) 202) and memory (e.g., memory 206). In some embodiments, the first vehicle includes one or more cameras (e.g., cameras 266). Specifically, in some embodiments, a data processing module 228 (FIG. 2) of the first vehicle 102A is applied to perform the method 1200.

The first vehicle obtains (1202) a plurality of images along a road. In some embodiments, the plurality of images are captured by one or more cameras (e.g., cameras 266) attached to the first vehicle. In some embodiments, the method 1200 includes obtaining, for each image of the plurality of images, a respective timestamp (e.g., timestamp 616, FIGS. 6A and 6B) corresponding to a respective time at which the respective image was captured.

For each image of the plurality of images, the first vehicle detects (1204), from the image, a plurality of image regions each corresponding to a respective vehicle light (e.g., a front light, a tail light, a signal light, or a brake light) of a second vehicle positioned on the road near the first vehicle. In some embodiments, the respective vehicle light is positioned at the front of the second vehicle (e.g., a front light). In some embodiments, the respective vehicle light is positioned at the back of the second vehicle (e.g., a tail light or a brake light). In some embodiments, the second vehicle is located in front of, next to, or behind, the first vehicle. In some embodiments, the first vehicle is traveling on an ego lane and the second vehicle is traveling on a lane adjacent to the ego lane.

In some embodiments, for each image of the plurality of images, the first vehicle applies a detection model (e.g., object detection model 230A, FIG. 6A) to detect the plurality of image regions corresponding to a plurality of vehicle lights of the second vehicle and generate a respective bounding box (e.g., bounding boxes 614 in FIGS. 6A and 6B; bounding boxes in FIGS. 8B and 8C) around each respective vehicle light of the plurality of vehicle lights.

In some embodiments, the first vehicle applies the detection model to classify each of the respective plurality of vehicle lights to have a classification selected from the group consisting of: a left vehicle light, a right vehicle light, and a middle vehicle light.

In some embodiments, the detection model is obtained by training, using machine learning, an object detection model (e.g., obstacle detection model) using a plurality of training images with labeled vehicle lights.

For each image of the plurality of images, the first vehicle determines (1206), for each image region, a probability (e.g., probability 806, FIG. 8A) that a respective vehicle light of the second vehicle changed its state.

In some embodiments, the first vehicle generates (1208), for each image of the plurality of images, a composite image (e.g., composite image 702, FIG. 7) that includes the plurality of image regions (e.g., image regions 704, FIG. 7). Each image region of the plurality of image regions corresponds to a respective vehicle light of the second vehicle. In some embodiments, generating the composite image includes concatenating the bounding boxes (e.g., bounding boxes 614) that are generated around the subset of vehicle lights.

In some embodiments, the first vehicle normalizes (1210), for each image of the plurality of images, an intensity (e.g., gray level) of the respective image prior to generating the composite image. In some embodiments, the first vehicle performs the intensity normalization to eliminate artifacts associated with changes in ambient lighting conditions (e.g., the second vehicle moving from a more shaded area to a less shaded area, or vice versa) during a time interval associated with the composite image, which may result in errors in predicting the light status of the second vehicle.

In some embodiments, the first vehicle compares (1212) a first composite image generated from a first road image taken at a first time to a second composite image generated from a second road image taken at a second time, wherein the second time is subsequent to the first time. The first vehicle determines whether there are any differences in the first and second composite images. In some embodiments, the first vehicle uses the determined differences predict the vehicle action of the second vehicle.

In some embodiments, determining whether there are any differences in the first and second composite images includes determining differences associated with each image region, corresponding to a respective vehicle light of the second vehicle, in the first and second composite images. As an example, in some embodiments, in accordance with a determination that the differences in the first and second composite images are associated with one image region, such as a region corresponding to only the left vehicle light or a region corresponding to only the right vehicle light, the first vehicle predicts that the vehicle action of the second vehicle is a turn action. As another example, in some embodiments, in accordance with a determination that the differences in the first and second composite images are associated with at least two image regions (e.g., two image regions corresponding to the left and right vehicle lights, or two image regions corresponding to the left and middle vehicle lights, or two image regions corresponding to the middle and right vehicle lights), the first vehicle predicts that the vehicle action of the second vehicle is a braking action.

In some embodiments, the time difference between the first time and the second time is determined based on a standard frequency of vehicle light changes of vehicles. For example, SAE J1690 and associated standards FMVSS 108 and IEC 60809 specify 60 to 120 flashes per minute (or 1-2 flashes every second) for turn signals, which is equivalent to a turn signal frequency of 1.5 Hz to 2.5 Hz. In some embodiments, a time difference between the first time and the second time falls within a range of about 0.2 seconds to about 0.5 seconds.

In some embodiments, determining whether there are any differences in the first and second composite images includes subtracting pixel values of the second composite image from corresponding pixel values of the first composite image, for one or more of: a red component, a green component, or a blue component (e.g., RGB components) of the first and second composite images.

In some embodiments, the determining includes generating (1214), for the plurality of images, a plurality of composite images. The method 1200 includes applying a light status change classifier (e.g., light status change classifier 804) to determine, based on the plurality of composite images, a respective probability that a respective vehicle light of the second vehicle changed its state. For example, in some embodiments, the light status change classifier compares pairs of composite images, each respective pair of composite images having a predefined timestamp difference (e.g., 0.2 to 0.5 sec), and determines, for a respective pair of composite images, a respective probability that a respective vehicle light changed its state during the time duration specified by the timestamp difference.

In some embodiments, the light status change classifier is obtained by training, using machine learning, a classification model using a plurality of training images labeled with vehicle light states.

In some embodiments, the determining further comprises assigning, to a respective image region: a first probability value corresponding to a change in state of the respective vehicle light from a first state to a second state (e.g., from an "on" state to an "off" state) during a first predefined time interval (e.g., 0.2 to 0.5 sec), a second probability value corresponding to a change in state of the respective vehicle light from the second state to the first state (e.g., from an "off" state to an "on" state) during the first predefined time interval, and a third probability value corresponding to no change in state of the respective vehicle light during the first predefined time interval. The sum of the first probability value, the second probability value and the third probability value equals to one. This is illustrated in, e.g., output 812 in FIG. 8B and output 826 in FIG. 8C.

In some embodiments, the first predefined time interval is determined based on a standard frequency of vehicle light changes of vehicles (e.g., 1.5 Hz to 2.5 Hz.)

The first vehicle predicts (1216) a vehicle action of the second vehicle based on the probability for each image region. Some example vehicle actions of the second vehicle that are predicted by the first vehicle can include braking, lane switching, or exiting a highway.

In some embodiments, the first vehicle applies (1218) a prediction model (e.g., prediction model 904) to predict the vehicle action of the second vehicle based on the probability of each image region. In some embodiments, the prediction model is a temporal convolution neural network. For example, the temporal convolution neural network is configured to process a temporal sequence of probabilities (e.g., 5 successive probabilities) associated with an image region to predict a vehicle action. In some embodiments, the prediction model is a rule-based system that applies one or more predefined rules based on knowledge of a standard turn frequency (e.g., 1.5 Hz to 2.5 Hz) to predict the vehicle action of the second vehicle.

In some embodiments, the first vehicle repeats (1220), for each image of the plurality of images, the detecting, determining, and predicting for one or more additional vehicles in the image.

The first vehicle at least partially autonomously drives (1222) the first vehicle based on the predicted vehicle action of the second vehicle.

In one or more examples, the functions described may be implemented in hardware, software, firmware, or any combination thereof. If implemented in software, the functions may be stored on or transmitted over, as one or more instructions or code, a computer-readable storage medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable storage medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first vehicle could be termed a second vehicle, and, similarly, a second vehicle could be termed a first vehicle, without departing from the scope of the embodiments. The first vehicle and the second vehicle are both vehicle, but they are not the same vehicle if not explained in some specific embodiments.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for predicting turning and braking actions of vehicles, comprising:
    at a first vehicle including one or more processors and memory:
        obtaining a plurality of images along a road;
        for each image of the plurality of images:
            detecting, from the image, a plurality of image regions each corresponding to a respective vehicle light of a second vehicle positioned on the road near the first vehicle;
            normalizing an intensity of the respective image or image regions;
            generating a composite image that includes the plurality of image regions, each image region of the plurality of image regions corresponding to a respective vehicle light of the second vehicle; and
            determining, for each image region, a probability that a respective vehicle light of the second vehicle changed its state;
        predicting a vehicle action of the second vehicle based on the probability for each image region; and
        at least partially autonomously driving the first vehicle based on the predicted vehicle action of the second vehicle.

2. The method of claim 1, wherein the detecting further comprises:
    for each image of the plurality of images, applying a detection model to:
        detect the plurality of image regions corresponding to a plurality of vehicle lights of the second vehicle; and
        generate a respective bounding box around each respective vehicle light of the plurality of vehicle lights.

3. The method of claim 2, further comprising applying the detection model to classify each of the respective plurality of vehicle lights to have a classification selected from the group consisting of: a left vehicle light, a right vehicle light, and a middle vehicle light.

4. The method of claim 2, wherein the detection model is obtained by training, using machine learning, an object detection model using a plurality of training images with labeled vehicle lights.

5. The method of claim 1, wherein the determining further comprises:
    comparing a first composite image generated from a first road image taken at a first time to a second composite image generated from a second road image taken at a second time, wherein the second time is subsequent to the first time; and
    determining whether there are any differences in the first and second composite images,
    wherein the differences are used to predict the vehicle action of the second vehicle.

6. The method of claim 5, wherein determining whether there are any differences in the first and second composite images includes:
    determining differences associated with each image region, corresponding to a respective vehicle light of the second vehicle, in the first and second composite images.

7. The method of claim 5, wherein a time difference between the first time and the second time falls within a range of about 0.2 seconds to about 0.5 seconds.

8. The method of claim 5, wherein determining whether there are any differences in the first and second composite images includes:
    subtracting pixel values of the second composite image from corresponding pixel values of the first composite image, for one or more of: a red component, a green component, or a blue component of the first and second composite images.

9. The method of claim 1, wherein the determining further comprises:
generating, for the plurality of images, a plurality of composite images; and
applying a light status change classifier to determine, based on the plurality of composite images, a respective probability that a respective vehicle light of the second vehicle changed its state.

10. The method of claim 9, wherein the light status change classifier is obtained by training, using machine learning, a classification model using a plurality of training images labeled with vehicle light states.

11. The method of claim 1, further comprising:
repeating, for each image of the plurality of images, the detecting, determining, and predicting for one or more additional vehicles in the image.

12. A first vehicle, comprising:
a plurality of sensors;
a vehicle control system;
one or more processors; and
memory storing one or more programs configured for execution by the one or more processors, the one or more programs comprising instructions for:
obtaining a plurality of images along a road;
for each image of the plurality of images:
detecting, from the image, a plurality of image regions each corresponding to a respective vehicle light of a second vehicle positioned on the road near the first vehicle;
normalizing an intensity of the respective image or image regions;
generating a composite image that includes the plurality of image regions, each image region of the plurality of image regions corresponding to a respective vehicle light of the second vehicle; and
determining, for each image region, a probability that a respective vehicle light of the second vehicle changed its state;
predicting a vehicle action of the second vehicle based on the probability for each image region; and
at least partially autonomously driving the first vehicle based on the predicted vehicle action of the second vehicle.

13. The first vehicle of claim 12, wherein the instructions for the determining further comprise instructions for assigning, to a respective image region:
a first probability value corresponding to a change in state of the respective vehicle light from a first state to a second state during a first predefined time interval;
a second probability value corresponding to a change in state of the respective vehicle light from the second state to the first state during the first predefined time interval; and
a third probability value corresponding to no change in state of the respective vehicle light during the first predefined time interval.

14. The first vehicle of claim 13, wherein the first predefined time interval is determined based on a standard frequency of vehicle light changes of vehicles.

15. A non-transitory computer-readable storage medium storing one or more programs configured for execution by one or more processors of a first vehicle, the first vehicle further including a plurality of sensors and a vehicle control system, the one or more programs comprising instructions for:
obtaining a plurality of images along a road;
for each image of the plurality of images:
detecting, from the image, a plurality of image regions each corresponding to a respective vehicle light of a second vehicle positioned on the road near the first vehicle;
normalizing an intensity of the respective image or image regions;
generating a composite image that includes the plurality of image regions, each image region of the plurality of image regions corresponding to a respective vehicle light of the second vehicle; and
determining, for each image region, a probability that a respective vehicle light of the second vehicle changed its state;
predicting a vehicle action of the second vehicle based on the probability for each image region; and
at least partially autonomously driving the first vehicle based on the predicted vehicle action of the second vehicle.

16. The non-transitory computer-readable storage medium of claim 15, the one or more programs further comprising instructions for:
applying a prediction model to predict the vehicle action of the second vehicle based on the probability of each image region.

17. The non-transitory computer-readable storage medium of claim 16, wherein the prediction model is a temporal convolution neural network.

18. The non-transitory computer-readable storage medium of claim 16, wherein the prediction model is a rule-based system that applies one or more predefined rules based on a standard turn frequency to predict the vehicle action of the second vehicle.

* * * * *